S. DOMINGUEZ.
AUTOMOBILE WHEEL.
APPLICATION FILED SEPT. 1, 1916.

1,225,789. Patented May 15, 1917.
2 SHEETS—SHEET 1.

Witnesses

Salvador Dominguez
Inventor by
Attorneys

S. DOMINGUEZ.
AUTOMOBILE WHEEL.
APPLICATION FILED SEPT. 1, 1916.
1,225,789.
Patented May 15, 1917.
2 SHEETS—SHEET 2.
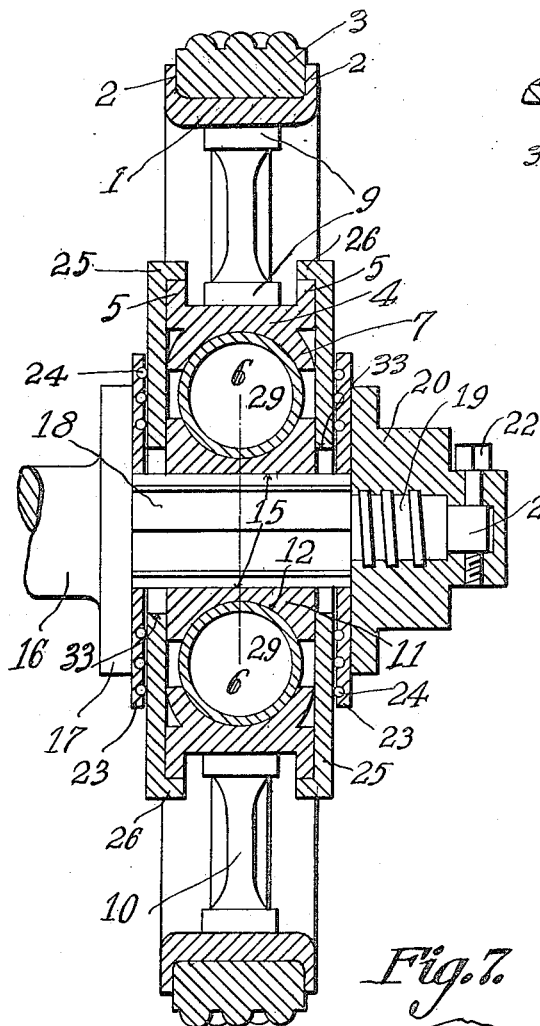
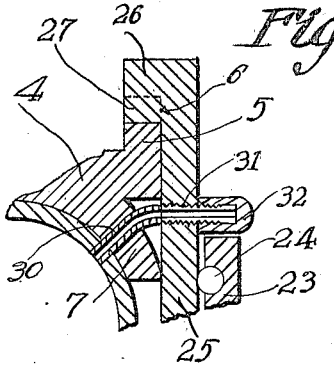
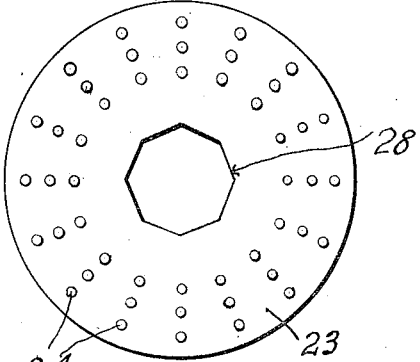
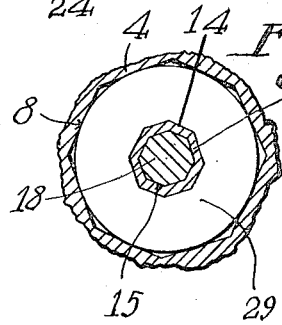
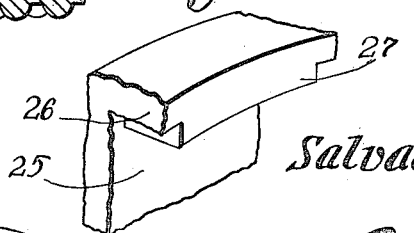
Salvador Dominguez
Inventor

UNITED STATES PATENT OFFICE.

SALVADOR DOMINGUEZ, OF SAN ANTONIO, TEXAS.

AUTOMOBILE-WHEEL.

1,225,789.  Specification of Letters Patent.  Patented May 15, 1917.

Application filed September 1, 1916. Serial No. 118,126.

*To all whom it may concern:*

Be it known that I, SALVADOR DOMINGUEZ, a citizen of Mexico, residing at San Antonio, in the county of Bexar and State of Texas, have invented a new and useful Automobile-Wheel, of which the following is a specification.

The device forming the subject matter of this application is a wheel of the general type which is adapted to be used upon automobiles.

The invention aims to provide novel means whereby a cushion, preferably in the form of an inflatable tube, may be interposed between the hub portion of the wheel and the outer part thereof, to afford the necessary resiliency, the cushion being housed within the contour of the wheel, against injury, thereby rendering it unnecessary to employ pneumatic tires and like structures subject to puncture and deterioration.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Fig. 3 is a section taken approximately on the line 3—3 of Fig. 2, Fig. 3, however, showing the complete wheel;

Fig. 4 is a fragmental section taken approximately on the line 4—4 of Fig. 1;

Fig. 5 is an elevation showing one of the wear plates;

Fig. 6 is a fragmental section taken approximately on the line 6—6 of Fig. 3, the cushion appearing in elevation; and Fig. 7 is a fragmental perspective showing a portion of one of the side plates.

Figure 1:
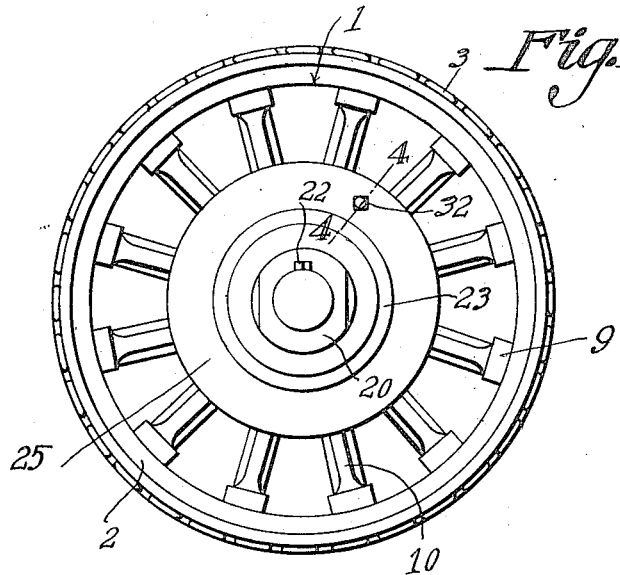
Figure 1 shows in side elevation, an automobile wheel constructed in accordance with the present invention.
Figure 2:
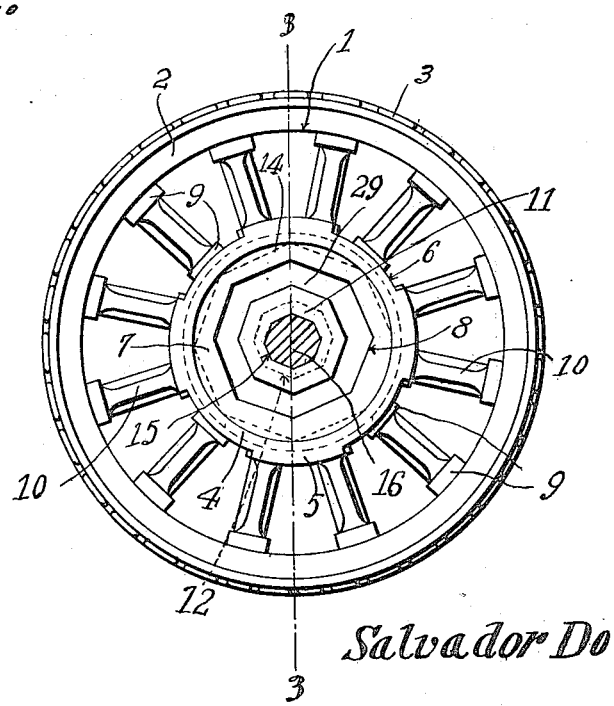
Fig. 2 is a side elevation wherein certain elements have been removed in order that the internal construction of the wheel may clearly appear.

In carrying out the present invention there is provided an outer rim 1 which may be equipped with side flanges 2, or be otherwise constructed, to retain a tire 3 of any desired sort, the tire 3 preferably being solid, although possessing some resiliency if desired, for the purpose of avoiding unnecessary noise. The numeral 4 designates an outer hub having outwardly projecting side flanges 5 equipped at intervals with notches 6. The hub 4 includes a seat 7. In cross section, as shown in Fig. 3, the seat 7 is concaved. If the seat 7 is viewed in side elevation, as in Fig. 2, it will be seen that the seat has a polygonal opening 8 therethrough. The outer rim 1 and the hub 4 are provided with sockets 9 in which are secured the ends of rigid spokes 10.

The numeral 11 designates an inner hub, in the outer edge of which is formed a concave seat 12, coöperating with the seat 7 of the outer hub 4. When the hub 11 is viewed sidewise, it will be seen that its periphery is polygonal, as shown at 14, to coöperate with the polygonal opening 8 in the hub 4. The hub 11 has an internal polygonal opening 15. The numeral 16 denotes an axle carrying an abutment plate 17 and including a polygonal extension 18 received against rotation in the polygonal opening 15 of the hub 11. The axle 16 terminates in a threaded spindle 19 on which is mounted a nut 20. The spindle 19 includes a stem 21 received in the outer end of the nut 20, the nut being held on the stem 21 by means of a securing device 22 of any desired sort.

Wear plates 23 abut against the inner side of the nut 20 and against the inner side of the plate 17, the wear plates 23 having polygonal openings 28 receiving the polygonal extension 18 of the axle 16 against rotation. The inner faces of the wear plates 23 carry balls 24 or like anti-friction elements. The numeral 25 denotes side plates, the outer faces of which bear against the balls 24 of the wear plates 23. The side plates 25 have openings 33 which are sufficiently large in diameter, so that the side plates 25 can move vertically with respect to the polygonal extension 18 of the axle 16. At their peripheries, the side plates 25 are equipped with flanges 26 which project toward the median plane of the wheel and overhang the flanges 5 of the hub 4. The flanges 26 are provided at intervals with lugs 27, shown in Figs. 7 and 4, these lugs being received in the notches 6 which are formed in the flanges 5 of the hub 4. Thus, the side plates and the hub 4 are interlocked against independent rotation.

The numeral 29 denotes a cushion which may be an inflatable tube. This cushion 29 fits closely in the seat 12 of the hub 11 and in the seat 7 of the hub 4. Since the seats 7 and 12 are of polygonal outline, when viewed sidewise, the cushion 29 serves to connect the hub 4 with the hub 11 in such a way that the said hub 4 cannot move circumferentially, independently of the hub 11. An inflating pipe 30 may be connected with the tube or cushion 29, the pipe passing through one side of the seat 7 of the hub 4, and being connected with a coupling 31 which is carried by one of the side plates 25. The outer end of the coupling 31 may be closed by a removable cap 32.

In practical operation, the outer rim 1, being connected with the hub 4 by means of the spokes 10, will move vertically along with the hub 4, the tube or cushion 29 yielding vertically to permit such an operation. The side plates 25 move vertically with respect to the part 18 of the axle 16, because the openings 33 in the side plates are large enough to permit such an operation, the outer or lateral faces of the side plates 25 riding on the balls 24 which are carried by the wear plates 23.

The axle 16 has been shown as provided with a polygonal extension 18, the opening 15 in the hub 11 being shaped accordingly. This construction is desirable on the rear wheels of an automobile, where the axle 16 constitutes a means for driving the wheels. When it is desired that the wheels shall not be axle-driven, as is the case with the front wheels of a vehicle, then the part 18 of the axle may be of circular cross section, the opening 15 being shaped accordingly. A skilled mechanic having before him the showing of the present drawings, will be capable of making such a change, without the aid of specific delineation.

Having thus described the invention, what is claimed is:—

In a device of the class described, an axle; wear plates carried by the axle; side plates mounted to reciprocate with respect to the axle and located between the wear plates, the side plates being provided at their peripheries with flanges which project toward the median plane of the wheel, the flanges having lugs which project toward the axle; an outer hub provided at its sides with flanges which project away from the axle, the said flanges being peripherally provided with notches which extend entirely therethrough and are located exteriorly of the body portion of the hub, the notches receiving the lugs to prevent relative circumferential movement between the side plates and the hub; a tire; means for connecting the tire with the hub; an inner hub carried by the axle; and a cushion interposed between the hubs.

In testimony that I claim the foregoing as my own, I have hereto affixed my signature in the presence of two witnesses.

SALVADOR DOMINGUEZ.

Witnesses:
F. F. LUDAGH,
M. H. TRICE.

Copies of this patent may be obtained for five cents each, by addressing the "Commissioner of Patents, Washington, D. C."